United States Patent [19]

Paakkunainen

[11] Patent Number: 5,353,886

[45] Date of Patent: Oct. 11, 1994

[54] SWINGING ARM

[75] Inventor: Marko Paakkunainen, Tampere, Finland

[73] Assignee: Plustech OY, Tampere, Finland

[21] Appl. No.: 969,313

[22] PCT Filed: Aug. 14, 1991

[86] PCT No.: PCT/FI91/00251

§ 371 Date: Feb. 16, 1993

§ 102(e) Date: Feb. 16, 1993

[87] PCT Pub. No.: WO92/03328

PCT Pub. Date: Mar. 5, 1992

[30] Foreign Application Priority Data

Aug. 14, 1990 [FI] Finland .................... 904009

[51] Int. Cl.$^5$ ............................................. B62D 57/02
[52] U.S. Cl. ............................................. 180/8.1; 901/22
[58] Field of Search ................... 180/8.1, 8.2, 8.3, 8.6; 901/1, 22

[56] References Cited

U.S. PATENT DOCUMENTS

| | | | |
|---|---|---|---|
| 3,160,290 | 12/1964 | Wilson | 901/22 |
| 3,792,782 | 2/1974 | Melton | 901/22 |
| 4,202,423 | 5/1980 | Soto | |
| 4,558,758 | 12/1985 | Littman et al. | 180/8.1 |
| 5,161,631 | 11/1992 | Urakami | 180/8.1 |

FOREIGN PATENT DOCUMENTS

| | | | |
|---|---|---|---|
| 2947369 | 5/1981 | Fed. Rep. of Germany | |
| 264785 | 10/1989 | Japan | 901/22 |
| 601049 | 12/1977 | Switzerland | |
| 1217652 | 3/1986 | U.S.S.R. | 901/22 |
| 1313711 | 5/1987 | U.S.S.R. | 901/22 |
| 1662836 | 7/1991 | U.S.S.R. | 901/22 |
| 1368050 | 9/1974 | United Kingdom | |

Primary Examiner—Mitchell J. Hill
Attorney, Agent, or Firm—Pollock, Vande Sande & Priddy

[57] ABSTRACT

Load-bearing swinging arm which causes an advance movement of a mobile device by means of its pivoting movement is pivotally connected to a supporting structure in a pivotal relationship thereto about an axis of rotation, and a pair of actuators for effecting the pivoting movement is provided between the swinging arm and the supporting structure. The points of action acting on the supporting structure by way of the actuators are provided on both sides of the axis of rotation. The points of action effect moment simultaneously about the axis of rotation, and they will also effect a force couple at least in some position, for example, in a position critical in view of the load, the forces acting through the points of action being parallel, of equal magnitude and having opposite senses in the force couple.

9 Claims, 6 Drawing Sheets

SWINGING ARM

FIELD OF THE INVENTION

The present invention relates to a load-bearing swinging arm which causes an advance movement of a mobile device by means of its pivoting movement and is pivotally connected to another construction in a pivotal relationship thereto about an axis of rotation, and where an actuator for effecting the pivoting movement is provided between the arm and the construction at the pivot.

BACKGROUND OF THE INVENTION

The swinging arm of the above type forms a leg or a part thereof in a machine that moves supported by arms. In these types of mobile devices, in which wheels are replaced with legs that are by turns lifted up and set against a support for advancement, the problem has been to control the very large force or moment present between the supporting structure and the arm in such a manner that the supporting structure will not be subjected to excess loads which are in the practice quite large and shorten the life of the bearings, keeping further in mind that the structure should not be too complicated. On the other hand there are situations where high speed and small force are needed. The present disposals of actuators can not satisfy these two opposite needs.

SUMMARY OF THE INVENTION

The present purpose of the invention is to overcome the above-mentioned drawbacks. For achieving this purpose the points of action acting on the construction through the actuator are provided on both sides of the axis of rotation. It is now possible to utilize the so-called force couple principle at the pivot. In the situations requiring large turning moment in the pivot both actuators are provided for effecting a moment in the same direction about the axis of rotation simultaneously. Because the actuators are situated on both sides of the axis of rotation, the senses of action of their forces are opposite, thus at least partly mutually compensating the effects of their forces.

By taking into account the size of the actuators, the amount of supplied energy and the position of the points of action it is possible to accomplish a so-called ideal force couple. Consequently, only turning moment will be present in the pivot, and without the radial loads caused by the actuators. This has considerable importance as far as the moving sensitivity and service life of the pivot is concerned.

The placing of the actuators in accordance with the invention makes the control possibilities of the arm more versatile. In a non-critical load situation it is possible to provide only one of the actuators with the supply of energy. It is thereby possible to reach a great speed of movement by means of a small energy supply. The actuators can thus serve as a sort of gearing.

According to one advantageous embodiment the points of action are situated on the same line that intersects the axis of rotation. If the aim is an ideal force couple in several arm positions by means of a simple system, it can be achieved by placing the points of action at equal distances from the axis of rotation and provide the actuators for causing equal forces at the points of action.

According to one advantageous embodiment the swinging arm is also at its other end pivotally connected to another supporting structure in a pivotal relationship thereto about an axis of rotation. At this location all above-mentioned alternatives can be applied. Furthermore, the actuators acting on the supporting structure and on the other construction can be fixed on the same swinging arm, in which case the control of the whole leg will be facilitated because the actuators are in the same area.

According to one advantageous embodiment the actuators are placed inside the swinging arm in a housing-like construction where they are well protected but perform an optimal function. The housing-like construction makes the arm lighter, and the arm will be at the same time strong.

The present invention will be described in the following more closely by reference to the accompanying drawings, wherein

DETAILED DESCRIPTION OF THE PREFERRED EMBODIMENT

Figure 1:
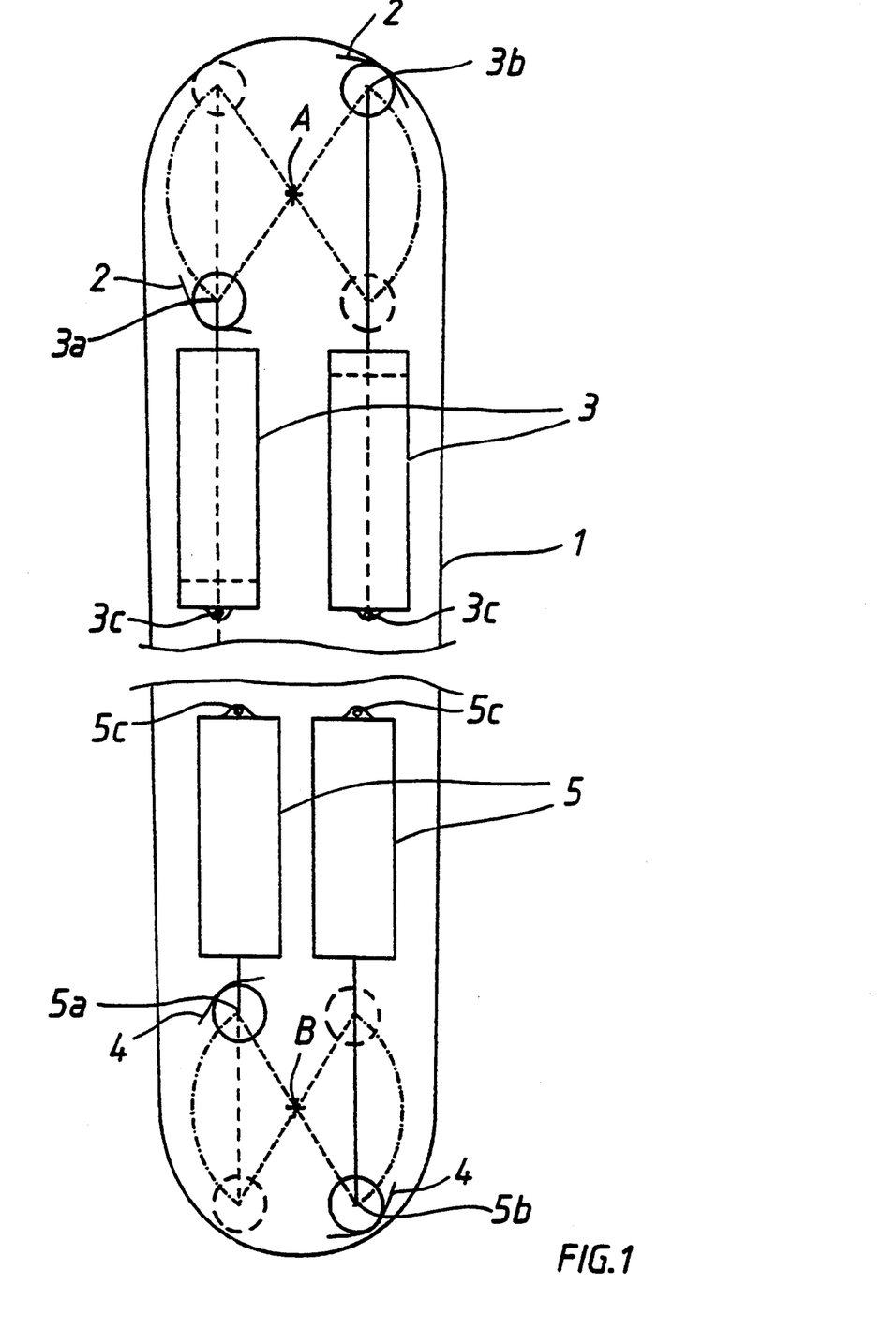
FIG. 1 shows the principle of the swinging arm in accordance with the present invention.

FIG. 1 shows a swinging arm 1 in accordance with the present invention as seen in its plane of pivoting, that is, in the direction of the axis of rotation A. A construction with respect to which the arm 1 is pivotal is denoted with reference numeral 2. At the pivot permitting the pivoting movement there is a pair of actuators designated as two actuators 3. One part of an actuator 3 is pivotally connected to the arm 1 so that it is relatively immobile with respect to the arm in the longitudinal direction of the actuator, and the other part that is movable with respect to the arm is attached to the construction 2. At this point is located the point of action of the actuator on the construction 2. The point mediates the turning of the arm 1 as the distance between the actuator part fixed on the arm and the point of action fixed on the construction changes due to the change of the length of the actuator. In accordance with the invention the points of action 3a and 3b are so placed that they are located on both sides of the axis of rotation A. In the practice this will have the effect that when the arm 1 is turned by means of the actuators 3, the distance of one of the points of action from the pivot point of the actuator on the arm will increase and that of the other will correspondingly decrease. FIG. 1 shows one of such extreme positions with uninterrupted lines and correspondingly the other of such extreme positions with broken lines. Dash-and-dot lines show the path of movement of the points of action between these extreme positions.

As shown by FIG. 1, the points of action 3a and 3b are further located within the contours of the arm 1 when the arm is looked at in the direction of the axis of rotation A. Also the other parts of the actuator 3, such as the actuator end pivotally connected to the arm 1, are also situated within the contours of the arm. The actuator 3 is pivotally fixed on the arm at point 3c using well-known solutions that make the path of movement of the points of action 3a and 3b possible.

The actuators can be of any type capable of transmitting force for movement between the arm 1 and the construction 2 by influencing the points of action 3a and 3b by means of the actuator. Among the variable length actuators can be chosen devices operated by means of pressure medium, especially hydraulic cylinders. The body of the cylinder can be attached to the arm 1 and the end of the piston rod will form a point of action on the construction 2, the rod being mountable and secured at this point in a known manner that allow the piston rod and the construction to pivot with respect to each other. It is also possible to accomplish the mounting such that the cylinder body may be pivotally connected to the construction 2 and the piston rod end correspondingly to the arm 1.

An important advantage in the present invention is the fact that the pivotal movement can be accomplished by using only one of the actuators 3, because this will be in certain cases sufficient for effecting the pivotal movement around the axis A, for example when the arm 1 is swung in a position where it is not subjected to the load of the construction supported by the arm. In the case of a hydraulic cylinder the inlet line to the inactive actuator and the outlet line from the same can be coupled together to form a free circulation, or the actuators can also be connected in series in this situation. The volumetric flow supplied to the actuators can be minimized without any harmful effect on the speed of movement of the arm. It is, however, preferred that, when desired, the arm can be turned in such a fashion that the points of action 3a and 3b simultaneously effect a moment about the axis of rotation A. Further, it is preferable that each of the actuators 3 can be used for effecting a moment in either of the directions when desired. In the case of hydraulic cylinders they are consequently double-acting, that is, when the piston is acted upon it is possible to achieve either a pushing force or a pulling force.

The points of action 3a and 3b can always be positioned and the actuators can be dimensioned in such a fashion that the points of action effect a force couple at least in one position, for example in a critical one in view of the load. At this particular phase of the swinging movement each of the points of action is so situated and the force exerted thereon is such that according to the laws of the mechanics the forces have opposite directions and are of equal magnitude.

The function and control of the swinging arm 1 will be facilitated if the points of action 3a and 3b are situated on the same line that intersects the axis of rotation A. According to the laws of mechanics the actuators 3 can be easily dimensioned with respect to each other in such a fashion that the optimal force couple effect will be present in points which are difficult in view of the load. FIG. 1 shows how the points of action are placed in this case at equal distances from the axis of rotation A. In an ideal case the actuators 3 are provided for effecting always equal forces at the points of action 3a and 3b. In the case of hydraulic cylinders this can be provided most practically by dimensioning the cylinders equal in size and making the work surface of the piston equal on both sides of the piston. In the practical solution embodying this idea the piston rod passes through the whole work space of the cylinder on both sides of the piston, which is schematically shown by broken lines in conjunction with the cylinders 3 of FIG. 1. In course of the swinging movement at whichever position into whichever direction at a predetermined work pressure prevailing in the cylinder at the given position independently of the direction of movement, the absolute value of the total moment is always equal at the given position. The individual moments influencing through the points 3a and 3b may slightly deviate from each other due to a slightly asymmetrical location of the force lines determined by the actuators 3, but for the purpose of the turning moment causing the movement of the arm this fact has little importance.

FIG. 1 shows further the fact that when the points 3a and 3b are situated on the same line extending through the axis of rotation A, an ideal force couple can act through them at two separate positions, namely at the positions where the force lines are parallel and intersect the path of movement of the points having the form of a circle arc.

When the points of action are situated on the same line that intersects the axis of rotation A, the forces of equal magnitude in the couple can be produced by means of hydraulic cylinders using the formula $$p_a \times A_a = p_b \times A_b,$$

wherein the left side is directly proportional to the force produced by one cylinder and the right side is in the same proportion directly proportional to the force produced by the other cylinder, whereby $p_a$ and $p_b$ are the work pressures prevailing in the cylinders, and $A_a$ and $A_b$ are the corresponding areas on which the aforementioned pressures are acting.

In this way it is possible to always accomplish an ideal force couple at two points on the condition that the actuators are mounted at right points on the arm 1.

It should further be noted that the formula illustrates the situation at a given time. The pressure is a factor that can be constantly varied and this possibility can be utilized during the movement. The pressures can also be variable independently of each other.

The above-described dimensioning formula can be utilized in one direction of movement only, or in both directions of movement. In theory a force couple operative in whichever direction can be produced also by means of such cylinders where the work areas on the opposite sides of the piston are different, for example due to the fact that the piston rod is not passed through the cylinder within both work spaces. This provision requires different work pressures in the same cylinder, depending on the direction of movement.

It is also possible to alter the force caused by the actuators during the movement, for example, in the case of hydraulic cylinders their work pressures can be altered. In this way a greater force can be applied at predetermined points within the range of movement.

The above study with the formula applies in an analogical manner also to other actuators in addition to the hydraulic cylinders, factors $A_a$ and $A_b$ corresponding to the capacity of the actuator to produce a force in proportion to a force producing factor $p_a$ and $p_b$ supplied thereto.

If the line between the points of action 3a and 3b does not intersect the axis A, an ideal force couple can be provided only at a predetermined position in case the actuators cause always the same constant force. Also this falls within the scope of the invention, even though in the case of FIG. 1, the dimensioning of the actuators and the positioning of the points of action is preferred in the sense that an ideal force couple will prevail at two critical positions regarding the load, either when the movement proceeds in one direction or when it proceeds in either direction. This kind of situation will be present for example when the arm 1 supports the load in such a fashion that the arm forms an angle with the vertical plane.

FIG. 1 shows further the corresponding arrangement at the opposite end of the arm for providing a relative movement between other construction 4, such as another swinging arm, and the arm 1. At this end there is a pair of actuators attached to the arm at points 5c, the pair comprising two actuators 5 and the corresponding points of action 5a and 5b acting on a construction, as well as an axis of rotation B situated between the points of action. The rotation of the arm 1 and the other construction 4 with respect to each other takes place around the axis of rotation. All alternatives mentioned in conjunction with the actuators 3 and the points of action 3a and 3b can be applied in an analogical manner to the actuators 5 and the points of action 5a and 5b. As illustrated by FIG. 1, both the actuators 5 and their points of action 5a and 5b lie also in this case within the contours of the arm as the arm is looked at in the direction of the axis of rotation B. Further, the Figure illustrates excellently how in this type of arm 1 incorporating the axes of rotation A and B at its both ends the actuators 3 and 5 causing the rotation can be provided in the same arm, that is, all actuators can be centralized in a single unit.

In the following some practical solutions of the arm according to the present invention and other structures associated therewith are described in more detail.

Figure 2:
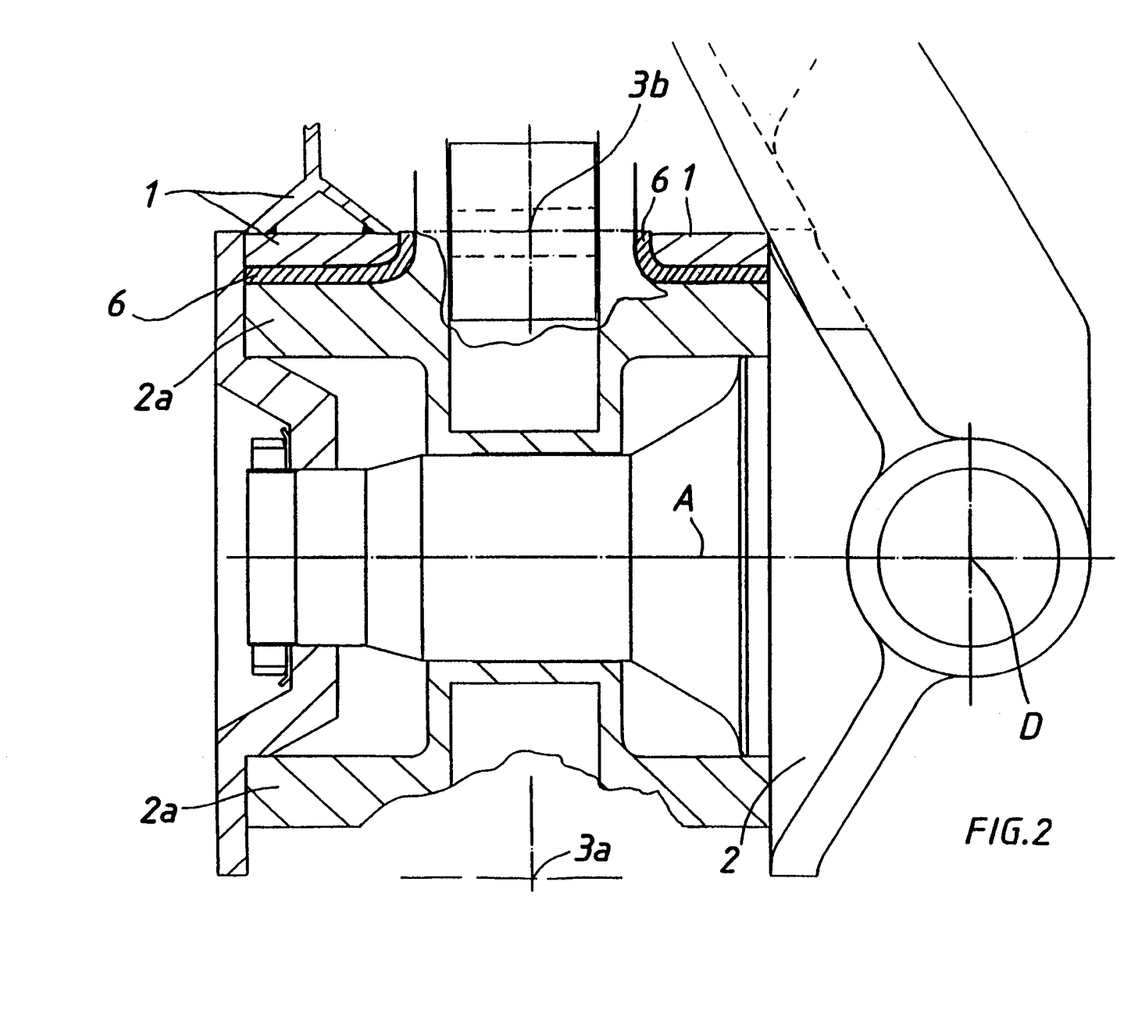
FIG. 2 shows one embodiment of the pivotal connection in a sectional view at the axis of rotation A.

FIG. 2 shows a cross-section of the pivotal connection to the construction 2 at the axis of rotation A. The arm 1 is made pivotal by fixing the ends of the actuators 3 on the construction 2 which in the Figure is formed of a part 2a surrounding the axis of rotation A and fixed on the body of the machine in a non-rotating relationship thereto. The part is equipped with bearings of circular shape in the plane perpendicular to the axis of rotation A (in the case of Figure slide bearings 6), inside which bearings part 2a is situated and on the outer circumference of which the arm 1 is mounted in pivotal relation thereto. The structure of the arm 1 will be described hereinafter more closely. As shown by FIG. 1, the bearings 6 are situated in the direction of the axis of rotation A on both sides of the points of action 3a and 3b, that is, on the opposite sides of the plane of the points of action 3a and 3b, whereby a symmetrical structure without any torsional forces can be provided. FIG. 2 illustrates further how the fixing points 3a and 3b of the actuators are located in the plane perpendicular to the axis A outside the bearing surfaces 6 in the brackets provided in the part 2a, and situated between the bearings 6 as seen in the direction of axis A.

Figure 3:
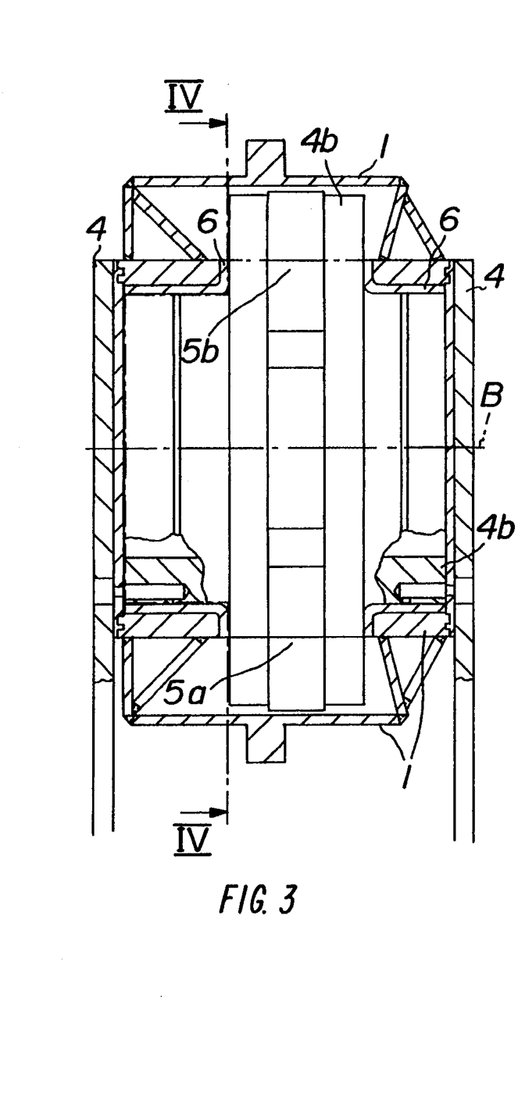
FIGS. 3 and 4 show another embodiment of the pivotal connection in a sectional view at the axis of rotation and in longitudinal section along the longitudinal direction of the arm, respectively.
Figure 4:
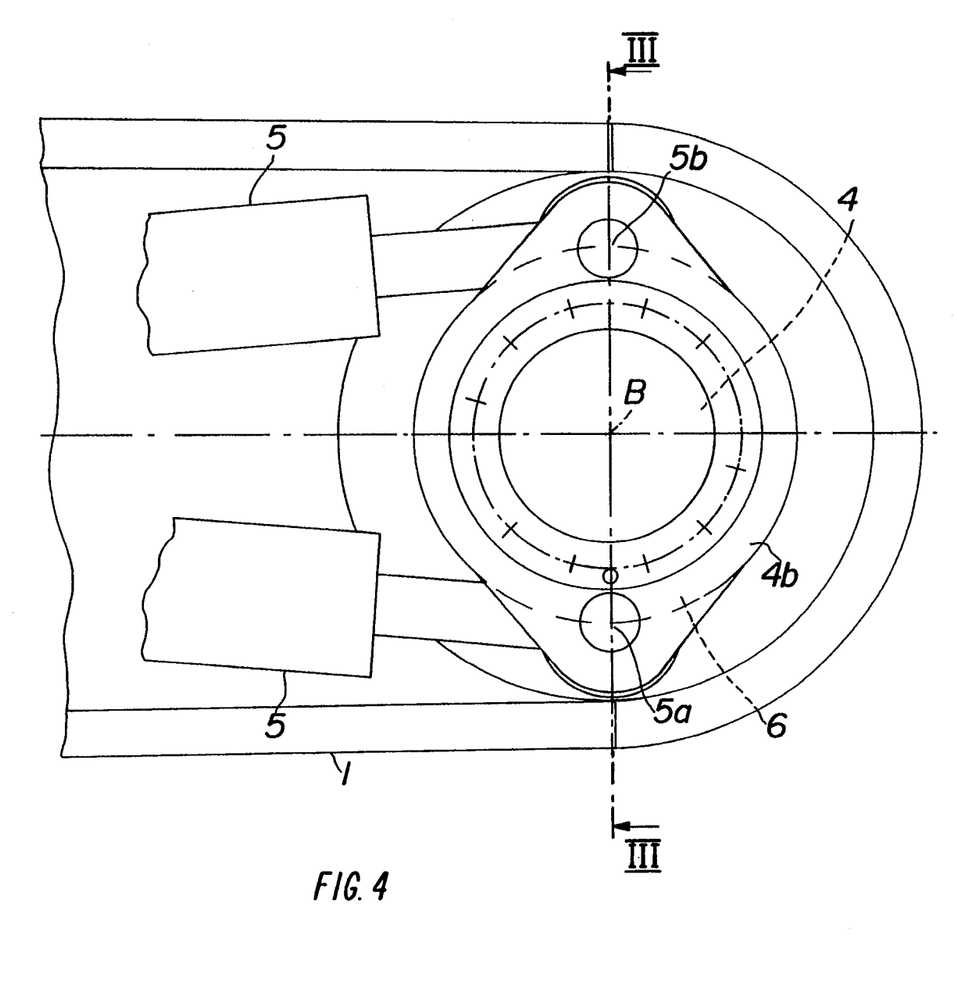

FIGS. 3 and 4 show another possible structure. Although it depicts the structure at one end of the arm 1 where the arm 4 pivotal with respect thereto is mounted, it can be also used at the location shown by FIG. 2. The parts of the arm 4 are here denoted with reference numeral 4b and the bearings are of the same principle as in FIG. 2. The Figure reveals also the housing-like structure of the arm 1, that is, all actuators 3 and 5 and points of action 3a and 3b as well as 5a and 5b are situated well protected inside the housing-like arm, and thus they do not require much space. As in FIG. 2, also in this case the points of action, namely 5a and 5b, are attached to a part 4b connected to the arm 4 in non-rotating relationship thereto and lying between the bearings 6. In the case of FIGS. 3 and 4 the part 4b is situated between the extension of the longitudinal side walls of the arm 4. Also the arm 4 can be of a housing-like structure, even if no actuators were placed inside it. A light construction combined with strength will be the advantage in this case.

Figure 5:
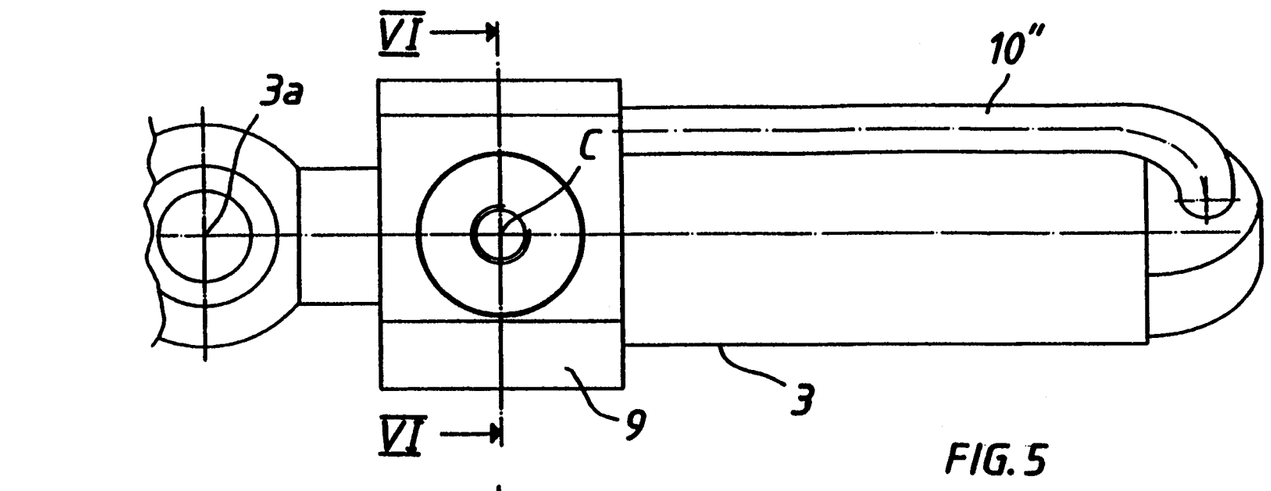
FIGS. 5 and 6 illustrate one possibility to accomplish the fixing of the actuator and the supply of pressure medium to the actuator in a side view and sectional view of the actuator.
Figure 6:
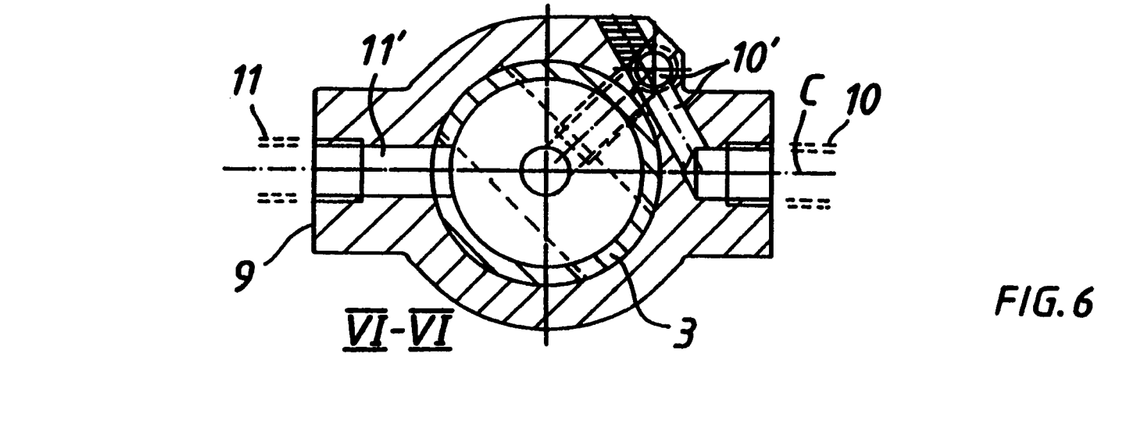

FIGS. 5 and 6 show an advantageous way to fix a hydraulic cylinder serving as actuator on the arm and to provide the supply of pressure medium thereto. The cylinder is also in this case made pivotal at the pivot point 3c inside the housing like structure. The pivotal connection is accomplished by a bearing piece 9 rigidly joined to the body of the cylinder, that is, to the part comprising the work chambers of the cylinder. The piece is at its both sides connected pivotally to the arm 1 at the bearing points provided in the opposite side walls of the housing-like construction of the arm. Passages 10', 11' for pressure medium are provided in the bearing piece 9 in such a fashion that the passage 10' extending into one of the cylinder chambers opens on one side of the bearing piece and the passage 11' leading to the chamber on the opposite side of the piston opens on the side located on the opposite side of the pivoting plane of the piece. Because the bearing piece 9 and the body of the cylinder 3 are joined together to a substantially mutually immovable relationship, the construction formed by the piece 9 and the cylinder 3, that is, the construction situated inside the arm 1 does not require any flexible hoses for delivering pressure medium into the cylinder. One passage 10' for pressure medium is led along the bores made inside the bearing piece to a rigid pipe 10" remaining inside the arm and joined to the surface of the bearing piece. The passage continues along the pipe into a chamber at one end of the cylinder. The other passage 11' is led straight along a bore formed at the pivoting axis of the bearing piece into the other chamber, which is situated on the opposite side of the piston with respect to the chamber. The passages 10' and 11' open on the outer surface of the bearing piece on the opposite sides of the pivoting plane of the arm 1. These points are constituted of holes, which are concentric with respect to the pivoting axis C between the arm 1 and the bearing piece 9 and which are of such structure that the respective conduits 10 and 11 situated outside the arm and serving as inlet and outlet lines of the pressure medium (illustrated schematically by broken lines in FIG. 6) can be fixed thereon by using a rotating or flexible fitting. Due to the structure the fittings can be fixed outside the arm 1 to the part 9 that is joined rigidly to the cylinder 3, and the flow of the pressure medium into and from the cylinder takes place inside the arm solely along the rigid and firm construction formed of the bearing piece 9, cylinder 3 and pipe 10". No hoses and fittings which might cause some uncertainty factors in the operation of the device and make its maintenance difficult is thus needed inside the housing-like arm 1.

FIG. 5 shows further the possibility that the pivoting point 3c for connecting the actuator 3 to the arm 1 need not necessarily be situated at the opposite end of the actuator in its longitudinal direction as seen from the connecting point between the construction 2 and actuator 3. According to FIG. 5 the pivoting point is situated in the cylinder 3 as to the construction 2 as possible, that is, in the part containing the work chambers of the cylinder at the point where the piston rod emerges from the cylinder. By this provision the strength and reliability of the construction can be increased, because forces tending to bend the cylinder due to a possible deformation of the arm 1 can be minimized in this way.

Although reference is made above to the actuators between the construction 2 and the arm 1, the same structure and fixing principles are applicable also to the actuators 5 between the arms 1 and 4.

The actuators connected pivotally to both sides of the arm by the bearing pieces 9 in the fashion shown by FIGS. 5 and 6 are connected at their other ends preferably in the way shown by FIGS. 2 and 3, according to which the same arm is in a corresponding manner pivotally connected on both sides of the construction (2a and 4b) to which the actuators are pivotally connected.

Figure 7:
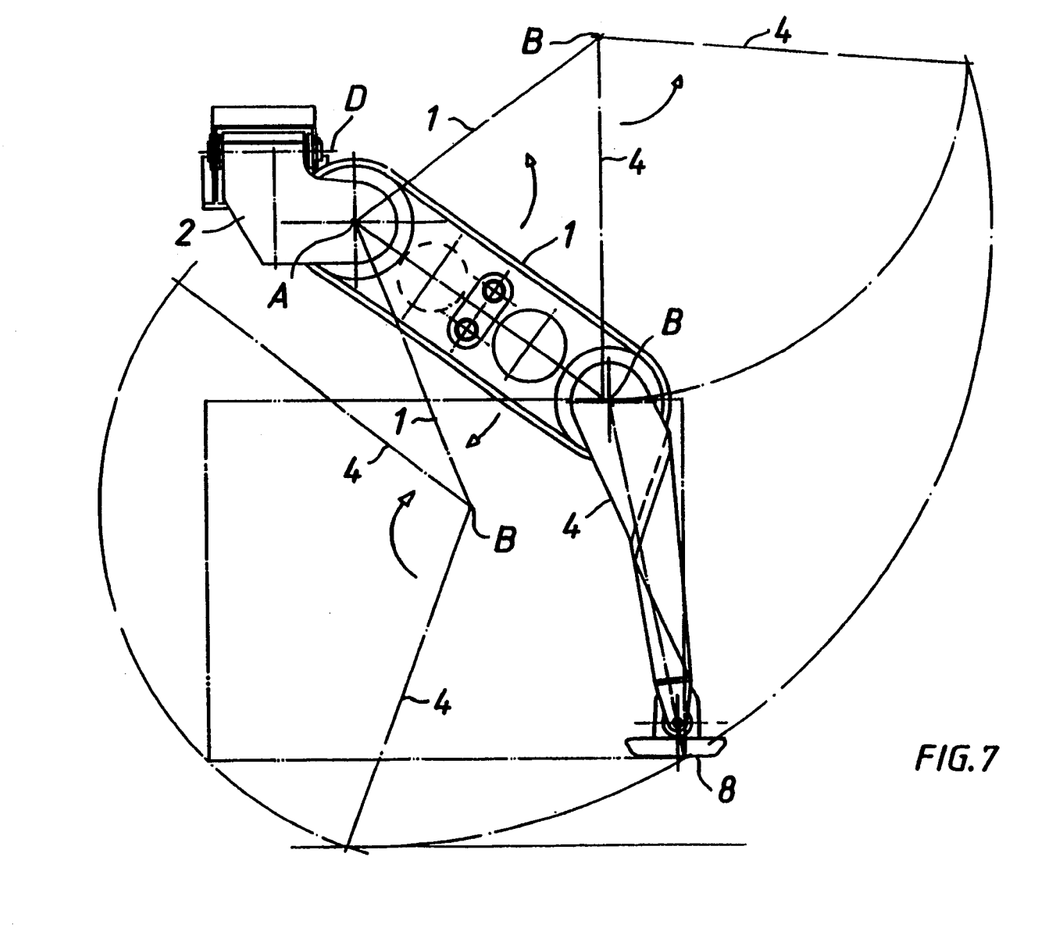
FIG. 7 shows a leg with the arm construction of the invention seen from the side.
Figure 8:
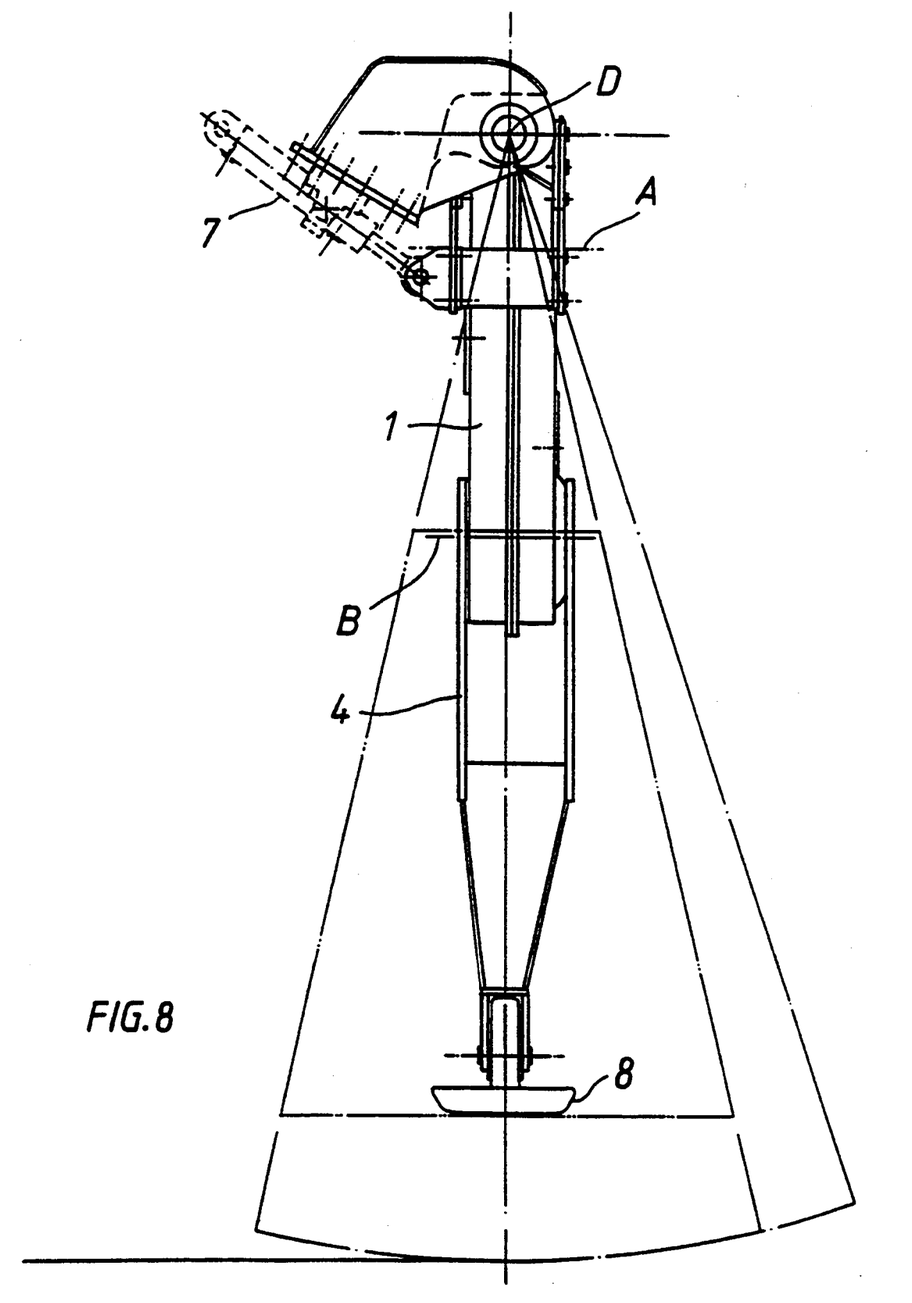
FIG. 8 shows the leg of FIG. 7 seen from the front.

FIGS. 7 and 8 show a larger construction incorporating the above-described arm 1. The Figures show a leg of a machine travelling on a support for advancement. The advancement of the machine takes place through the movement of the leg. The construction 2 is in this case a construction through which the arm 1, which can be designated as thigh section, is mounted on the body of the machine. The construction 4 comprises another arm mounted at the opposite end of the arm 1, and it can be designated as shin section. The arms 1 and 4 form the leg which for its part supports the machine body, and this kind of apparatus comprises for example four, preferably six such legs symmetrically divided onto both sides of the longitudinal center line of the machine. A foot section 8 at the free end of the arm 4 serves as point of support against the support for advancement in this kind of leg. As is inferable from the Figures, the pivots at the axes of rotation A and B are subjected to quite large stresses when the leg is situated on the support for advancement, the fact which makes the present invention very applicable in this connection. It should be further noted that the paths of movement enabled by the pivots are quite extensive, which makes the possibility to provide the effect of the invention in all mutual positions of the arms and the machine body 2 important. For example in case of FIG. 5 the turning of the arms 1 and 4 can take place in such a way that the lines extending between the axes of rotation A and B and the foot section serving as the support point shift from one side of the vertical plane to the other side, in which event the provisions according to the invention are of particular importance.

As the leg is free, that is, the support point is loose from the support of advancement, the pivotal movement about the axes A and B takes place only against the own weight of the arms 1 and 4. In this situation it is possible to use only one of the actuators 3 or 5 for accomplishing the corresponding movement, because the load is not great. In case of actuators operated by pressure media also smaller amount of flow of the working medium is sufficient, and for example if hydraulic cylinders are used, one of them can be switched to free circulation or the cylinders can be coupled also in series.

FIGS. 7 and 8 show also some paths of movement of the arms 1 and 4, the respective extreme positions being denoted by dash-and-dot lines and by corresponding reference signs. In this connection it should also be noted that the arms 1 and 4 can be moved sideways within a certain angle on both sides of the vertical plane due to the fact that the arm 1 is attached to a part 2 which is pivotal with respect to the machine body, the pivoting movement taking place about a horizontal axis D perpendicular to the axes of rotation A and B. FIG. 8 shows further by broken lines an actuator 7 that controls the pivoting movement, the actuator being in this case a hydraulic cylinder. The corresponding part of a slightly different structure is illustrated also in FIG. 2 by corresponding reference signs.

The present invention is not restricted only to the embodiment disclosed in the Figures and description, but it can be modified within the scope of the invention. As mentioned above, both points of action do not necessarily take part in causing the turning moment at every instant, but it is important that this kind of possibility exists and that in critical load situations the force couple principle can be utilized for minimizing the loads on the bearings.

I claim:

1. A load-bearing swinging arm for causing an advance movement of a mobile device by means of its pivoting movement, said arm having a first end, a second end, and a pivot;

an arm support structure to which said arm at its first end is pivotally connected through said pivot about a first axis of rotation, said arm support structure comprising a part surrounding the first axis of rotation and affixed to the support structure in a nonrotating relationship thereto;

bearings positioned between the swinging arm and the arm support structure;

a pair of actuators each having a first end and a second end and positioned between the arm and the support structure at the pivot;

points of action for acting on the arm support structure on both sides of the axis of rotation for effecting a moment simultaneously about the axis of rotation during said pivoting movement the actuators being positioned in the swinging arm in such a manner that their first ends are pivotally connected to the support arm and their second ends at the points of action to said part fixed on the support structure; and wherein the swinging arm at its second end through a second pivot is connectable to another swinging arm in a pivotal relationship thereto about a second axis of rotation.

2. A load-bearing swinging arm according to claim 1, further comprising a second pair of actuators for effecting a pivoting movement, provided between the swinging arm and the other swinging arm at the second pivot; and points of action for acting on the other swinging arm on both sides of the axis of rotation for effecting a moment simultaneously about the second axis of rotation.

3. Swinging arm as claimed in claim 1, wherein the swinging arm has a position where at least one pair of the points of action effect a force couple, wherein the forces acting through the points of action are parallel, of equal magnitude and are applied in opposite directions.

4. Swinging arm as claimed in claim 3, wherein at least one pair of the points of action is situated on the line that intersects the respective axis of rotation.

5. Swinging arm as claimed in claim 1, wherein the actuators acting on the support structure are placed inside the swinging arm in a housing construction.

6. Swinging arm as claimed in claim 5, wherein inlet and outlet lines for a pressure medium are connected to a hydraulic cylinder serving as one pair of said actuators through a bearing piece positioned between the hydraulic cylinder and the swinging arm.

7. Swinging arm as claimed in claim 6, wherein the lines are connected through the bearing piece to opposite sides of the swinging arm.

8. Swinging arm as claimed in claim 7, wherein the hydraulic cylinder has two work chambers, the transfer of the pressure medium between the work chambers of the cylinder and the pressure medium lines outside the swinging arm being accomplished inside the arm through pressure medium channels having rigid walls.

9. Apparatus for causing an advance movement of a mobile device comprising:

first and second load-bearing swinging arms connected together, wherein said first arm comprises a first end and second end and a pivot through which said first arm at its first end is connected to an arm support structure about a first axis of rotation, said support structure comprising a part surrounding the first axis of rotation and affixed to the support structure in a non-rotating relationship thereto;

bearings positioned between the first swinging arm and the support structure;

a first pair of actuators each having a first end and a second end being positioned between the first swinging arm and the support structure at the pivot and first points of action for acting on the support structure on both sides of the axis of rotation for effecting a moment simultaneously about the axis of rotation during said pivoting movement, the actuators being positioned in the swinging arm in such a manner that their first ends are pivotally connected to the arm and their second ends at the first points of action to said part fixed on the support structure, the first swinging arm at its second end through a second pivot being connected to said second swinging arm in a pivotal relationship thereto about a second axis of rotation; and a second pair of actuators for effecting a pivoting movement being provided between said first swinging arm and said second swinging arm at the second pivot and second points of action for acting on said swinging arm on both sides of the axis of rotation for effecting a moment simultaneously about the second axis of rotation.

* * * * *